INVENTOR
OSWALD O. SUNDERLAND
BY John F. Hanrahan
ATTORNEY

Patented Mar. 20, 1945

2,371,855

UNITED STATES PATENT OFFICE 2,371,855

CONSTANT TORQUE CLUTCH

Oswald O. Sunderland, Fairfield, Conn.

Application May 18, 1942, Serial No. 443,422

6 Claims. (Cl. 192—56)

This invention relates to new and useful improvements in clutches and has particular relation to a clutch for delivering a constant torque and which includes means adjustable whereby the maximum torque to be delivered by the clutch may be varied.

The objects and advantages of the invention will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claims.

The clutch of the invention is particularly for use in connections where overloads are likely to be placed on a power transmission system. Such overloads, unless absorbed, may result in the breakage of parts, the stalling of a prime mover, or the like. With the clutch of the invention only up to a predetermined torque may be transmitted and an overload being applied to the clutch, either suddenly or otherwise, the elements of the clutch are opened without damage to any part of the clutch and without damage to any part of a system in which the clutch is incorporated.

My clutch finds ready application in trucks, tanks and like vehicles as well as in other connections wherein overloads are likely to be suddenly impressed on a mechanical system. The clutch may be associated with the individual drive wheels and tracks of trucks and tanks or may be interposed between an engine and a transmission, or the like. In mechanisms of the kind mentioned, particularly in tanks, sudden stops, starts, reversals and turns result in various serious and sudden applications of force. In such mechanisms the clutch of the invention finds particular application although it is not restricted to use in such devices.

Figure 1:
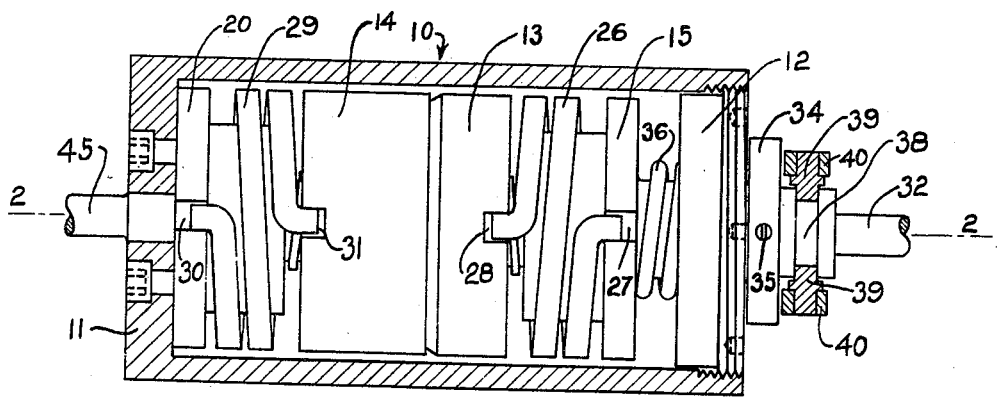
Fig. 1 is a top plan view of the clutch of the invention, the housing thereof being in longitudinal section.
Figure 2:
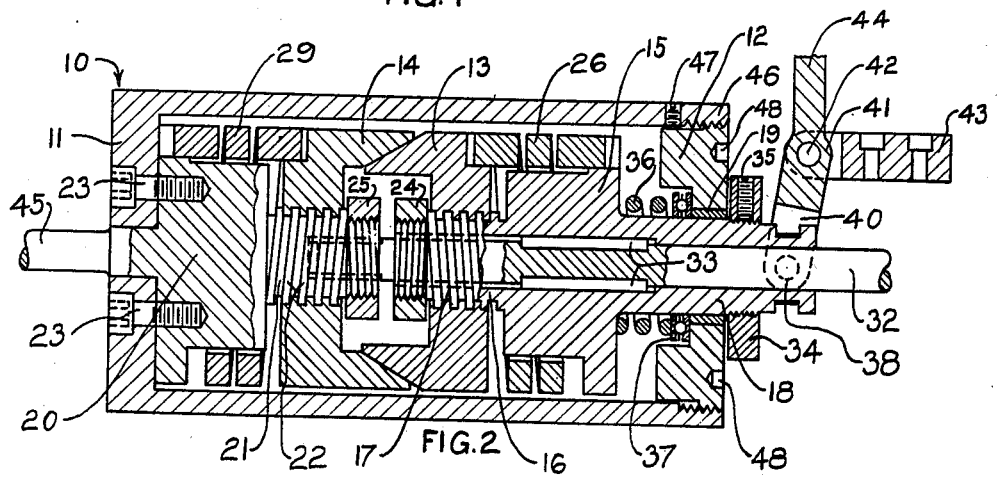
Fig. 2 is a central vertical sectional view through the clutch, including the complete housing, the view being taken as along the plane of the line 2—2 of Fig. 1.

Referring in detail to the drawing and at first more particularly to Figs. 1 and 2 my clutch as shown includes a cylindrical housing 10 including an integral end wall 11 and a removable end wall 12. Within housing 10 are complemental clutch elements comprising driving clutch element 13 and driven clutch element 14. Element 13 is associated with a head 15 and the latter includes a reduced diameter integral extension 16 onto which the element is threaded as at 17. A sleeve-like extension 18 projects from the other side of head 15 through a bearing 19 in the housing wall 12.

A second head 20 within housing 10 is secured to the end wall 11 of the housing and includes an integral reduced diameter extension 21 externally threaded as at 22 and onto which is threaded the clutch element 14. Head 20 is secured to the housing wall by any desired means as, for example, the screws 23. On the free end portions of the extensions 16 and 21, respectively, are stops in the form of collars 24 and 25 rigid with the extensions. Attention is here directed to the fact that the extensions are threaded in opposite directions and the purpose of such construction will be set forth.

A heavy coil spring 26 has its respective end portions disposed in notches or recesses 27 and 28 in the head 15 and element 13 while a similar but oppositely coiled spring 29 has its respective end portions disposed in notches or recesses 30 and 31 in the head 20 and element 14. A driving shaft 32 passes through the head 15 and its extensions 16 and 18 and is keyed to the head to drive the same like keys being shown at 33. The inner end of shaft 32 has bearing in the forward portion of the extension 21 of head 20 and the shaft may be driven in any suitable manner and by any desired means.

At the outer side of housing wall 12 a limiting means or collar 34 is threaded onto the sleeve-like extension 18 and a set screw 35 provides means whereby the collar may be locked to the sleeve-like extension against any casual movement relative thereto. A coil spring 36 bears against the head 15 and also against a thrust bearing 37 at the inner side of the wall 12. Spring 36 is constantly tending to move head 15 and its associated parts in the direction of head 20 or in a direction to have the clutch elements 13 and 14 normally engaged.

The outer end portion of the sleeve-like extension 18 is provided with a groove 38 receiving pins 39 carried by the arms 40 of a yoke 41. Such yoke is pivoted at 42 onto a suitable bracket 43 and has integral therewith or rigidly connected thereto a manual or lever 44. Clearly on rocking of this lever 44 in one direction the sleeve 18 and therefore the head 15 and extension 16 will be drawn in a direction to carry the clutch element 13 away from the element 14. Also on the lever 44 being thereafter released the coil spring 36 will return the mentioned parts to normal positions with the clutch element 13 engaged with the element 14.

When the clutch is not in use the stop 34 is spaced from wall 12 as shown. Head 15 is driven in any suitable manner as by the shaft 32 (it being understood that the shaft is shown merely to illustrate a complete embodiment of the invention). When the head is turned in a direction tending to wind up the spring 26 and unwind the spring 29, both springs being normally without tension, the head 15 and extension 16 turn relative to element 13 until the spring 26 is tensioned. During such relative turning movement element 13 is threaded back on extension 16 but is kept in full engagement with element 14 since the assembly 13, 16 and 15 is being pressed forward by spring 36.

On spring 26 being sufficiently tensioned it drives the element 13 with head 15 and thus drives element 14 in a direction tending to uncoil spring 29. Thus element 14 is fed outwardly on its threaded extension 21 into tight engagement with stop 25. Then head 20, extension 21 and element 14 form a solid mass and said head is rotated with the element and drives shaft 45.

The spring 26 is designed to deliver only a predetermined constant maximum torque and should an overload be placed on head 15 the spring 26 will not be rigid enough to transmit such overload but will transmit the predetermined constant torque and will yield in a direction to further coil. As this occurs the head and its extension 16 turn in the element 13 and due to the screw threaded connection between said element and extension 16 the element is fed back further on the extension in a direction away from the element 14. However, spring 36 feeds the parts forward to keep element 13 in full driving relation with element 14 until stop 34 comes against wall 12 when further threading of element 13 on extension 16 results in slipping of element 13 on element 14 preventing transmission of the overload while yet delivering the predetermined torque.

Unless element 14, extension 21 and head 20 are being held they will be rotated by element 13 during the initial movements set forth but the driven parts will probably be rotated at a lower speed and as these parts gain momentum spring 26 returns the element 13 and extension 16 back toward normal relationship. On removal of the entire load spring 26 returns such parts to the normal relationship.

When head 15 is driven in the opposite direction, that is in a direction tending to unwind spring 26, the head and its extension 16 initially move relative to element 13 with the result that the latter is fed forward on the extension and jammed against stop 24. Then head 15 and element 13 move as a unit and element 13 drives element 14 in a direction to wind spring 29 and the initial movement of element 14 is to wind such spring and feed the element back along extension 21 until the spring has sufficient tension to drive head 20. As element 14 moved back on extension 21 spring 36 caused element 13 to follow and keep in driving relation with said element 14.

On an overload being applied spring 29 being designed to deliver only a predetermined maximum constant torque is further coiled resulting in further feeding of element 14 in a direction away from element 13 but the spring 36 functions to keep these parts in full driving relation until and unless stop 34 is advanced into engagement with the wall 12. When this last occurs element 14 may lose full driving relation with element 13 and slip on the latter but element 13 is delivering the constant torque and as element 14 and parts driven thereby gain momentum the relation of the parts shifts back to normal as will be understood.

From the foregoing it will be seen that while the head 15 is being driven in one direction the continued application of an overload will result in element 13 being fed in a direction away from full driving relation with element 14 and if the overload is applied while the head 15 is being driven in the opposite direction the element 14 will be fed in a direction away from full driving relation with element 13. However, at all times element 13 is delivering the predetermined constant torque. The elements are not moved out of contact but to such relation that element 13 delivering the constant torque is slipping on element 14 until the overload is removed as by the driven element 14 reaching the speed of the driving element 13.

End wall 12 is threaded into the housing 10 and is fixed against casual movement by a set screw 47. On loosening of this screw and adjusting the wall inwardly or outwardly the relation of the stop 34 to said wall may be varied. In this way the overload points of the clutch may be adjusted. The same result may be obtained by adjusting the stop 34 on the sleeve-like extension. 48 are sockets in wall 12 and are adapted to be engaged by a tool for the purpose of turning such wall in making an adjustment of the latter.

Figure 3:
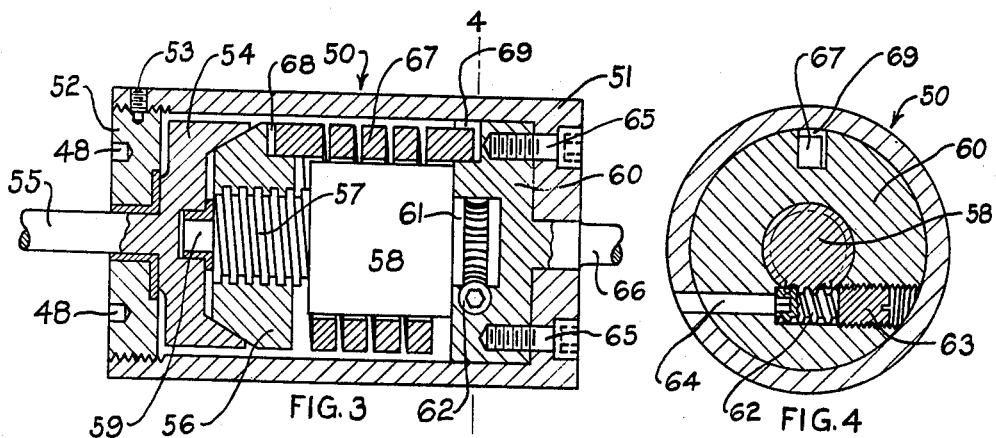
Fig. 3 is a view similar to Fig. 2 but showing a modification.
Figure 4:
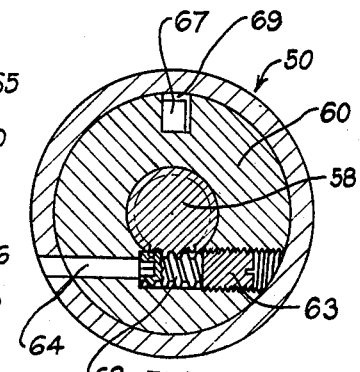
Fig. 4 is a transverse sectional view taken as along the plane of the line 4—4 of Fig. 3 but through the complete clutch.

The clutch of Figs. 3 and 4 is somewhat simpler in construction than that of Figs. 1 and 2 but is designed for slipping of its elements only when an overload is applied when driving in one direction. On the clutch of Figs. 3 and 4 being driven in the opposite direction its elements are forced tight against one another and are not released on the application of an overload.

Referring in detail to Figs. 3 and 4 the clutch there shown includes a housing 50 having one integral end wall 51 and an end wall 52 threaded into place and secured there as by a set screw 53. This wall 52 is provided with the recesses or sockets 48 for the purpose above set forth. Within housing 50 is a driven clutch element 54 having a shaft 55 connected thereto or integral therewith and a driving clutch element 56 screwed onto a threaded portion 57 of an extension 58. The outer portion 59 of said extension has bearing in the element 54 and the inner portion of said extension has bearing in a head 60 and therein is provided with or has formed thereon a worm gear 61 meshing with a worm 62 mounted in said head.

Worm 62 is held in place by a screw 63 and meshing with the worm gear 61 holds the extension 58 in fixed relation to the head 60. An opening 64 gives access to the worm whereby the latter may be turned to adjust the extension 58 relative to the head 60 for a purpose to be described. Screws 65 secure head 60 to wall 51 and such head has connected thereto or formed integral therewith a shaft 66 extending through wall 51 and adapted to be rotated by any suitable means.

A heavy coil spring 67 has its respective end portions disposed in sockets 68 and 69 in the driving clutch element 56 and the head 60. With the described construction as the head is driven the extension 58 rotates with it and as the head is driven in one direction the movement is transmitted by spring 67 to clutch element 56 and the latter drives element 54 and shaft 55. This movement of the head is in a direction tending to further coil spring 67 but unless there is an overload the spring is not further coiled but simply delivers the load to element 56.

On an overload being applied the spring is further coiled and the head and extension move as a unit but relative to the clutch element 56 and thus the latter (owing to the threaded connection of said element with its extension) is fed back in a direction away from element 54 slipping on the latter but continuing to deliver the predetermined constant torque for which spring 67 is set. When the head is driven in the opposite direction or in a direction tending to unwind spring 67 element 56 is fed forward into tight engagement with element 54 and there is no slippage on an overload being applied.

The overload point of the clutch of Figs. 3 and 4 is dependent on the tension of spring 67 and the tension of the latter may be adjusted to set the spring for the delivery of the desired load. This adjustment is accomplished through the manipulation of the worm 62 whereby to cause relative rotation of the extension 58 and the clutch element and the head and casing 50 to further wind up or to partly release the spring 67.

Having thus set forth the nature of my invention, what I claim is:

1. In a clutch, a pair of spaced heads having extensions arranged in opposing relation, complemental clutch elements on said extensions, a coil spring forming a driving connection between each head and the clutch element on its extension, means for turning one of said heads, said extensions having threaded engagement with the respective clutch elements and threaded in opposite directions, and said springs coiled in opposite directions whereby on turning of said head in one direction the spring of said head will yield on overload and its clutch element will be fed in a direction away from the other clutch element and on turning of the said head in the opposite direction the spring of the other head will yield on overload and its clutch element will be fed in a direction away from the clutch element of the first head.

2. The clutch as in claim 1 including spring means normally maintaining one of said heads in position with its clutch element in engagement with the complemental clutch element, and manual means for shifting said head and its clutch element in a direction to carry the latter away from said complemental clutch element.

3. The clutch as in claim 1 including stops on said extensions and limiting movements of the clutch elements toward the ends of their respective extensions whereby on turning of said head in the first direction the clutch element of the other head is threaded forward against its stop and forms a turnable unit with its extension and head and on turning of said head in the opposite direction its clutch element is fed forward against its stop and forms a solid unit with its extension and said head.

4. The clutch as in claim 1 including a housing enclosing said heads and elements, means securing the other of said heads to a wall of said housing, a sleeve-like extension on said head and passing through the other wall of said housing, a shaft passing through said sleeve-like extension and having driving connection with said head, a spring against said head and said other wall of the housing and normally maintaining said head with its clutch element in engagement with the other clutch element, and manual means connected with said sleeve-like extension at the exterior of said housing and operable to shift said head and its clutch element against the action of said spring.

5. The clutch as in claim 1 including means adjustable to vary the overload points of the clutch.

6. The clutch as in claim 1 including spring means operable to urge one clutch element and its associated parts toward the other clutch element as one is shifted in a direction away from the other on its threaded mounting, and a stop limiting such movement of said element and its parts by the spring.

OSWALD O. SUNDERLAND.